Aug. 2, 1960 M. NAIMAN ET AL 2,947,592

HIGH FREQUENCY MAGNETIC TRANSDUCERS

Filed Aug. 25, 1955

INVENTORS
MARK NAIMAN
HOWARD SCHWARTZ

BY Charles C. English

AGENT

United States Patent Office 2,947,592
Patented Aug. 2, 1960

2,947,592

HIGH FREQUENCY MAGNETIC TRANSDUCERS

Mark Naiman, Philadelphia, Pa., and Howard Schwartz, Brooklyn, N.Y., assignors to Sperry Rand Corporation, New York, N.Y., a corporation of Delaware Filed Aug. 25, 1955, Ser. No. 530,532

12 Claims. (Cl. 346—74)

The present invention relates to magnetic transducer devices having improved operating characteristics at high frequencies, and is more particularly concerned with a novel transducer construction permitting plural information to be recorded and/or picked up on a plurality of independent tracks by a unitary multichannel magnetic head.

It is often desired to place or read information on a plurality of magnetic tracks, preferably disposed substantially parallel to one another on a record medium of magnetic material. In the past, such operation has been effected by a plurality of independent transducers physically spaced from one another; or by a composite magnetic transducer structure of relatively complex and costly construction. The present invention is concerned with the provision of a novel magnetic transducer capable of operating in the foregoing manner and providing a plurality of heads which are individually adapted to read or write information on a record medium. In addition, the present invention is concerned with such a novel multichannel head which may be made in smaller sizes and at less expense than analogous heads known heretofore, and which effect a greater economy of magnetic materials than has been the case in the past. In this latter respect, the present invention is further concerned with novel manufacturing techniques capable of utilization in the production of heads such as will be described, or in the provision of other forms of magnetic transducers, which techniques result in greater accuracy of alignment in the several structural portions comprising the head, as well as in a greater facility in the handling of small bodies of magnetic material.

In accomplishing the foregoing advantages of the present invention, it should be recognized that in the manufacture of magnetic transducers adapted for operation at relatively high frequencies, it is desirable to make such transducers of extremely thin magnetic laminations thereby to enhance the high frequency response of the over-all transducer. In addition, it is desirable to keep the gap abutment of the head as small as possible. In accordance with the present invention, these desiderata of heads adapted for high frequency operation are effected by constructing the operative portions of the head of an extremely thin laminaiton of magnetic material; and this lamination material, which may for instance comprise a single thickness of such material, is supported on a head body formed of a non-magnetic material, which head body preferably comprises a non-magnetic metal. This provision of a metallic head body acts as a support for the single lamination of magnetic material utilized, thus making the use of such magnetic materials feasible; and in addition, acts as a highly conductive, and hence electromagnetic shielding, metal matrix providing eddy current shielding for the over-all structure and minimizing the permissible flux paths around the shielding.

The head structure, in accordance with one embodiment of the present invention, comprises two halved head bodies, and each half carries a series of pole pieces, formed of magnetic laminations, which mate when the two halves are assembled. The magnetic lamination pole pieces are in turn secured to the head body or bodies by an adhesive or by other techniques such as soldering, welding, etc.; and may originally be fabricated in the form of a comb thereby to assure accurate alignment of opposing pole pieces more simply and economically than has been the case heretofore. In addition, as will be discussed, the opposing pole pieces formed of the described magnetic laminations need not be of the same width, and in fact one pole piece only for each head structure need be accurately machined to the width of a recording channel, while the other pole piece may be somewhat larger than this channel width whereby the construction is further simplified by reducing the necessity of providing close machining tolerances to a single series of pole pieces. These several manufacturing techniques thus permit ready handling of magnetic laminations or foils in the construction of magnetic heads having extremely good high frequency response characteristics whereby improved heads may be manufactured more readily and at less expense than has been the case heretofore.

It is accordingly an object of the present invention to provide an improved magnetic transducer.

Another object of the present invention resides in the provision of a novel multichannel magnetic transducer.

A further object of the present invention resides in the provision of a magnetic transducer having better high frequency response characteristics than has been the case heretofore.

A still further object of the present invention resides in the provision of magnetic transducers utilizing supported foils or laminations of magnetic material whereby the operating characteristics of the transducer are improved and an economy of magnetic material is effected.

A still further object of the present invention resides in the provision of novel techniques for the handling of small bodies of magnetic material.

A still further object of the present invention resides in the provision of manufacturing and handling techniques for plural pole pieces in magnetic transducers of the multichannel type whereby more ready and accurate disposition and alignment of such plural pole pieces may be effected than has been the case heretofore.

A still further object of the present invention resides in the provision of a novel magnetic transducer comprising mating pole pieces wherein precision fabrication may be confined to one only of the pole pieces.

The foregoing objects, advantages, construction and operation of the present invention will become more readily apparent from the following description and accompanying drawings, in which.

Figures 1, 2:
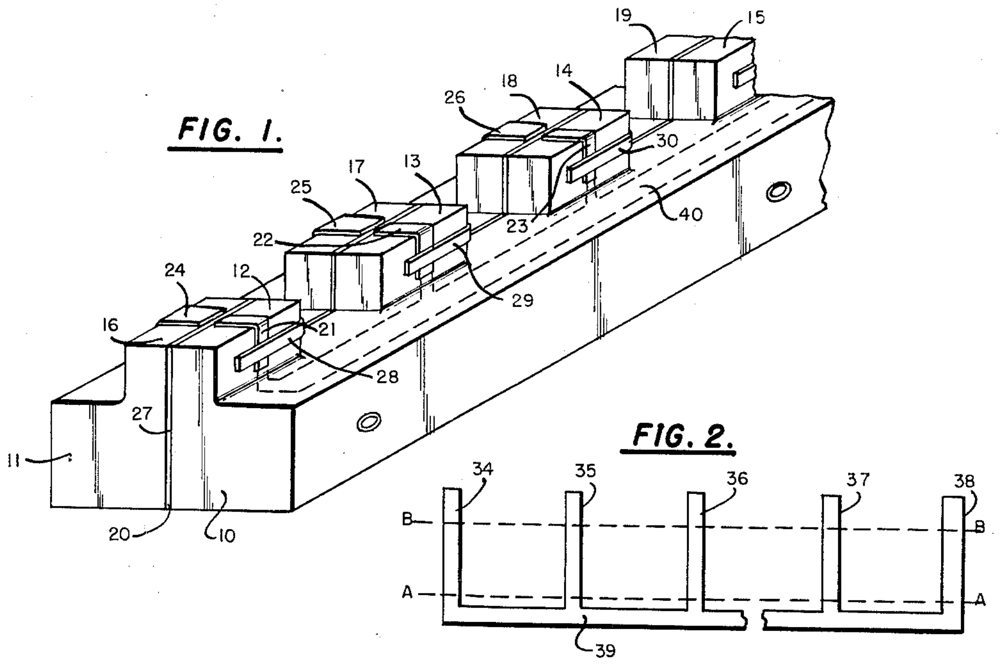
Figure 1 illustrates an improved multichannel magnetic transducer constructed in accordance with one form of the present invention.
Figure 2 illustrates a comb-type lamination of magnetic material adapted to be employed in the provision of magnetic heads in accordance with the present invention.

Referring now to Figure 1, it will be seen that, in accordance with the present invention, a magnetic transducer may comprise a first head body 10 and a second head body 11, each of which head bodies is constructed of a non-magnetic material such as aluminum. The head body 10 defines a plurality of upstanding projections 12 through 15 inclusive; while the head body 11 defines a further plurality of complementary up-standing projections 16 through 19 inclusive. It will be appreciated from an examination of Figure 1, that the head bodies 10 and 11 are adapted to be assembled in facing relationship along a common junction 20 whereby the several up-standing projections of the head bodies are in alignment with one another; namely, projections 12 and 16 are in alignment, 13 and 17 are in alignment, etc.

Each of the up-standing projections 12 through 15 carries a lamination or foil of magnetic material 21 through 23, for instance, thereon; and similarly, each of the up-standing projections 16 through 19 carries a further lamination or foil of magnetic material 24, 25 and 26 thereon. The foil portions supported by opposing up-standing projections act as opposing pole pieces for a given magnetic head, and these opposing pole pieces are in turn separated by a strip of gap material 27 inserted between the said opposing pole pieces and between facing up-standing projections of the head bodies 10 and 11. A further U-shaped lamination, such as 28 through 30, bridges the opposing foil-type pole pieces comprising each of the magnetic heads, and these U-shaped laminations carry a control coil thereon.

Figure 3:
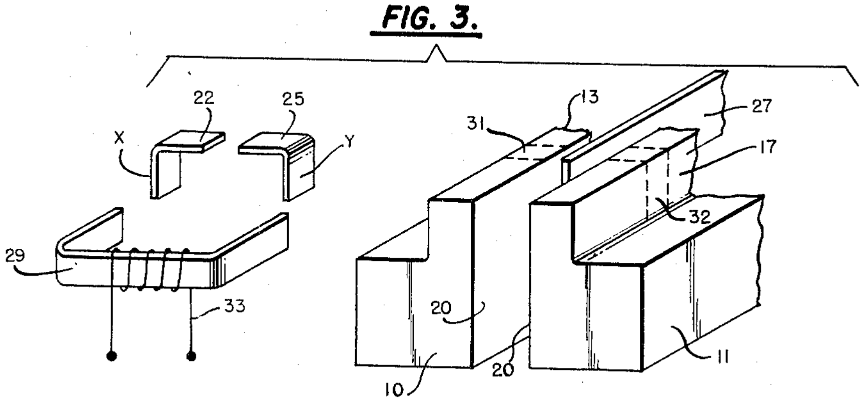
Figure 3 is an exploded representation of a single channel head illustrating the relative disposition of the several structural portions comprising the transducer of Figure 1.

The particular construction of each transducer portion shown in Figure 1 will be more readily appreciated from an examination of the exploded representation in Figure 3 which has segregated that portion of the transducer shown in Figure 1 corresponding to the up-standing head body portions 13 and 17.

Thus, referring to Figure 3, it will be seen that the said portions 13 and 17 are in substantial alignment with one another when the body portions 10 and 11 are placed in mating relationship along their surfaces 20; and the said portions 13 and 17 are in turn isolated from one another by a section of gap material 27. A first L-shaped foil portion 22 of magnetic material is adapted to be supported on the up-standing head body portion 13 at the dotted location 31, while a further L-shaped pole piece 25 of magnetic lamination or foil material is adapted to be supported on the head portion 17, for instance at the dotted location 32. Thus, head bodies 10 and 11 each support a foil-type pole piece such as 22 and 25, and these pole pieces are separated from one another adjacent the mating junction of the bodies 10 and 11 by gap material 27. The U-shaped lamination 29, which carries a control coil 33 thereon, is disposed in relation to pole pieces 22 and 25 as shown in Figure 3; and the arms of the said U-shaped member 29 are respectively contiguous with the lamination-type pole pieces 22 and 25, for instance at points X and Y, whereby a completed magnetic circuit is provided by pole pieces 22 and 25 in combination with bridging member 29 across the gap 27. This arrangement of pole pieces and head bodies thus permits extremely thin magnetic laminations to be utilized in providing the magnetically active portions of a transducer whereby the high frequency response of such a transducer is considerably enhanced.

In construction, the several pole pieces 21 through 23, and 24 through 26, may be individually formed as teeth of a comb-like magnetic lamination. Such a lamination is shown, for instance, in Figure 2 wherein the teeth serving to ultimately provide pole pieces are identified as 34 through 38 inclusive; and these teeth are joined to one another by a comb tail 39. A comb structure such as is shown in Figure 2 may be readily fabricated by a punching operation, and when so fabricated the width of each of the teeth 34 through 38 may be accurately stamped to a required channel width, and the said teeth 34 through 38 may also be accurately spaced from one another in accordance with a desired channel spacing.

After a comb of the type shown in Figure 2 has been prepared, the several teeth 34 through 38 may be bent upward substantially orthogonal to the tail 39 along a line A—A; and the teeth may then be further bent in a direction substantially parallel to the tail 39 along a further line B—B. When so bent, the comb defines a plurality of lamination-type pole pieces 34 through 38 supported in accurate alignment with respect to one another by the tail piece 39. Such combs may then be adhesively connected to each of the head body portions 10 and 11 in the manner illustrated in Figure 1, wherein a comb, bent in the manner described, is depicted by toothed pole pieces 21 through 23 and the dotted tail 40. After the comb has been adhesively secured to the up-standing portions of the head bodies 10 and 11 thereby to provide the required support for the pole pieces as well as the required accurate spacing between the several pole pieces, the tail of the comb (illustrated in dotted representation at 40) may be removed thereby to cause the several teeth of the comb to act as individual unconnected pole pieces. The inside faces of each head body 10 and 11 may then be ground flat whereby the outer extremity of each pole piece is in accurate alignment with the inner face 20 of the head body; and a strip of gap material, such as 27, may be inserted between the several pole pieces after which the said head body portions 10 and 11 may be fastened to one another and to a mounting plate.

The coil assembly comprising the coil, such as 33, wound about the U-shaped lamination, such as 29, is then inserted in the coil slots defined between the several up-standing projections 12—16, 13—17, 14—18, etc. of the head body; and these U-shaped laminations, such as 29, may be glued at their opposing ends to the opposed pole pieces, such as 22—25. It should be noted in passing that the area of contact between the opposing legs of each U-shaped lamination 29 and each pole piece, such as 22 and 25, may be made relatively large by the technique employed whereby the reluctance of the junctions between the said U-shaped bridging portions and the lamination-type pole pieces is relatively small and the use of an adhesive, such as glue, for retaining the U-shaped bridging portions in contact with the opposed pole pieces does not appreciably increase this reluctance.

Subsequent to assembly of a supported foil-type structure, in the manner described, the several coil wires providing the opposed terminals for coils such as 33, may be soldered to a suitable terminal board mounted on the head body and the top surfaces of the pole pieces may then be lapped to assure uniform flatness across the head.

To summarize the foregoing, it will be seen that an improved magnetic head may be constructed by adhesively securing a pair of comb-like magnetic laminations to a pair of non-magnetic supporting bodies; by then removing the tails of the combs to define a plurality of individual foil-type pole pieces; by then aligning the supporting structures with one another to effect a mating of opposed pole pieces separated from one another by suitable gap material; and by bridging individual opposed pole pieces with a further coil-bearing lamination adhesively secured to the said opposed pole pieces. As mentioned previously, this technique and the resulting transducer construction permits the use of foil-type magnetic materials in magnetic transducers with a resultant increase in high frequency response and saving in magnetic material. The transducer further provides excellent electromagnetic or eddy current shielding through the provision of a highly conductive but non-magnetic structure acting to support the individual foil-type magnetic pole pieces.

In the particular embodiment illustrated in Figure 1, it will be noted that the lamination or foil-type pole pieces 24 through 26 are of somewhat greater width than the pole pieces 21 through 23. This structure is exemplary of a still further economy of manufacture in accordance with the present invention. In the past, it has been the practice to cause opposed pole pieces to each exhibit a width equal to a recording track, and extremely accurate alignment between such opposed pole pieces has accordingly been required. By causing one pole piece of each pair of opposed poles to be somewhat greater in width than the other pole piece, however, poles such as 21 through 23 may be accurately machined to the track width while no such accuracy is required in respect to the width of pole pieces 24 through 26. As a result, the required accuracy of alignment between opposing pole pieces such as 21 and 24, is materially reduced and the resultant head nevertheless effects a desired track width of magnetization with but slightly greater fringing than has been the case when the opposed pole pieces are of the same width and are in accurate alignment with one another. This possible use of differently dimensioned pole pieces is, of course, not mandatory; but when the technique is employed, as illustrated in Figure 1, the required accuracy of machining is further reduced to a single comb-like structure; and the required accuracy of alignment between opposing pole pieces is similarly reduced.

Figure 4:
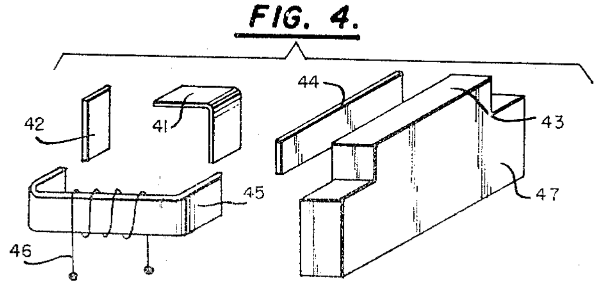
Figure 4 is an exploded representation of a single channel head illustrating the relative disposition of the several transducer portions in accordance with a modification of the structure shown in Figure 1.

In the embodiments thus far described in respect to Figures 1 through 3, a pair of mating head body portions 10 and 11 have been employed in providing a novel supported lamination magnetic transducer. In accordance with a still further embodiment of the present invention, illustrated in Figure 4, the head body may be fabricated of a single portion 47 rather than of mating portions such as 10 and 11. This head body 47 may then be adapted to support an L-shaped lamination-type pole piece 41 and an I-shaped lamination-type pole piece 42 adjacent opposing portions of an up-standing section 43 of the said body 47; and the pole pieces 41 and 42 may be separated, as before, by a strip of gap material 44 secured to one side of the head body 47 adjacent the up-standing portion 43. As before, each of the pole pieces 41 and 42 may comprise an individual tooth of a comb-like structure whereby multichannel heads may be fabricated and the pole pieces thereof may be aligned more readily than has been the case heretofore. Once more, opposing pole pieces such as 41 and 42, are bridged by a U-shaped lamination 45 carrying a coil 46 thereon.

While preferred embodiments of the present invention have been described, many variations will be suggested to those skilled in the art. The foregoing description is, therefore, meant to be illustrative only and all such variation as are in accord with the principles described are meant to fall within the scope of the appended claims.

Having thus described our invention, we claim:

1. In a magnetic transducer, a non-magnetic support structure, a pair of elongated pole pieces carried by said support structure in spaced relation to one another, each of said pole pieces comprising an elongated thin lamination of magnetic material, the directions of elongation of said pole pieces being substantially parallel to one another, a first extremity of at least one of said pole pieces being bent to extend toward a corresponding first extremity of the other of said pole pieces whereby said first extremities of said pole pieces are closely adjacent to and spaced from one another thereby to define an operative gap therebetween, a further elongated bridging lamination of magnetic material carried by said support structure in a direction transverse to the directions of elongation of said pole pieces, spaced points on said bridging laminations being respectively contiguous with each of said pair of pole pieces adjacent the other extremitities of said elongated pole pieces, and a control coil carried by said further briding lamination.

2. The transducer of claim 1 wherein said support structure comprises a pair of adjacent head bodies each of which carries one of said laminar pole pieces, and a body of non-magnetic gap material inserted between said pair of head bodies.

3. The transducer of claim 1 wherein said support structure is metallic in construction, a body of non-magnetic gap material carried by said support structure, one of said pair of pole pieces being carried by said gap material and the other of said pole pieces being carried directly by said support structure.

4. In a magnetic transducer, a non-magnetic support structure, a pair of elongated pole pieces carried by different sides of said support structure in spaced substantially parallel relationship to one another, each of said pole pieces comprising a single elongated lamination of magnetic material, and magnetic bridging means comprising a further elongated lamination of magnetic material disposed between and contiguous with said lamination-type pole pieces, said further elongated lamination being carried by said support structure and extending between said different sides of said support structure in a direction transverse to the directions of elongation of said pole pieces.

5. In a magnetic transducer, a non-magnetic support structure comprising a substantially rectangular body, a pair of pole pieces carried by said support structure in spaced relationship, each of said pole pieces comprising a single lamination of magnetic material, said pair of pole pieces each including pole portions respectively supported by opposed sides of said rectangular body in substantially parallel relation to one another, and magnetic bridging means disposed between and contiguous with said lamination-type pole pieces, said magnetic bridging means comprising a U-shaped lamination of magnetic material the legs of which are respectively contiguous with said pole portions in substantially orthogonal disposition to each of said pole portions.

6. In a magnetic transducer, a non-magnetic support structure, a pair of magnetic lamination pole pieces carried by said support structure, said pole pieces each having a substantially L-shaped configuration, first corresponding legs of said pair of L-shaped pole pieces being disposed substantially parallel to one another, second corresponding legs of said pair of L-shaped pole pieces being disposed substantially colinear with one another, the free ends of said second substantially colinear legs being spaced from one another thereby to define a gap therebetween, and a substantially U-shaped magnetic lamination having a pair of elongated legs respectively contiguous with and extending transverse to the said substantially parallel first legs of said pole pieces.

7. In a magnetic transducer adapted to cooperate with a magnetic recording track of a predetermined width, a pair of pole pieces each comprising a single thin lamination of magnetic material, and a non-magnetic support structure carrying said pole pieces in spaced relation to one another thereby to define a transducing gap therebetween, one of said pole pieces having a preselected width equal to said predetermined width of said magnetic recording track, the other of said pole pieces having a predetermined width intentionally greater than said predetermined width of said magnetic recording track.

8. In a multichannel transducer, an elongated support structure of non-magnetic material, first and second pluralities of pole pieces respectively comprising elongated thin laminations of magnetic material adhesively carried by opposite sides of said support structure in spaced relationship to one another, a third plurality of U-shaped magnetic laminations carried by said support structure in directions transverse to the directions of elongation of said pole pieces, the legs of said U-shaped laminations being disposed respectively adjacent said opposite sides of said support structure in contiguity with said first and second pole pieces, whereby each of said U-shaped laminations respectively bridges a pole piece of said first plurality to a pole piece of said second plurality, and a plurality of coil means respectively carried by said third plurality of magnetic laminations.

9. In a multichannel transducer, an elongated support structure of non-magnetic material, said support structure comprising first and second supporting members spaced from one another by an elongated section of gap material, first and second pluralities of pole pieces respectively comprising thin laminations of magnetic material adhesively carried by said support structure in spaced relationship to one another, said first and second pluralities of pole pieces being respectively carried by said first and second supporting members adjacent said gap material, a third plurality of magnetic laminations each of which respectively bridges a pole piece of said first plurality to a pole piece of said second plurality, and a plurality of coil means respectively carried by said third plurality of magnetic laminations.

10. The transducer of claim 9 wherein said support structure defines a plurality of substantially aligned upstanding projections spaced from one another in the direction of elongation of said elongated body, said first plurality of pole pieces being elongated in configuration and being elongatedly disposed along one side of each of said projections respectively, said second plurality of pole pieces being elongated in configuration and being elongatedly disposed along another side of each of said projections, the directions of elongation of said second pole pieces being substantially parallel to the directions of elongation of said first pole pieces, said third plurality of magnetic laminations being elongated in configuration and being carried by said projections respectively in directions transverse to the directions of elongation of said first and second pole pieces.

11. The transducer of claim 9 wherein said first plurality of pole pieces have widths intentionally different from the widths of said second plurality of pole pieces.

12. In a multichannel transducer, an elongated comb-like support structure of non-magnetic material defining a plurality of spaced substantially parallel upstanding tooth-like supports, first and second pluralities of magnetic lamina pole pieces supported in spaced relationship to one another by said plurality of tooth-like supports respectively, and a third plurality of magnetic laminations extending transverse to said first and second pole pieces and at least partially surrounding each of said tooth-like supports respectively, thereby to magnetically bridge said first plurality of lamina pole pieces to said second plurality of lamina pole pieces respectively, each of said third plurality of laminations including a coil supporting portion extending into the space between adjacent ones of said spaced tooth-like supports, and a plurality of coils carried respectively by said coil supporting portions of said third plurality of laminations, said coils being respectively located in the spaces between adjacent ones of said tooth-like supports.

References Cited in the file of this patent

UNITED STATES PATENTS

| | | |
|---|---|---|
| 2,594,414 | Garreau | Apr. 29, 1952 |
| 2,621,259 | Grantham | Dec. 9, 1952 |
| 2,653,189 | Camras | Sept. 22, 1953 |
| 2,706,752 | Dupy | Apr. 19, 1955 |
| 2,722,569 | Loper | Nov. 1, 1955 |
| 2,785,038 | Ferber | Mar. 12, 1957 |
| 2,855,466 | Wiegand | Oct. 7, 1958 |